Oct. 30, 1962 M. PACKER 3,061,572
POLYVINYL ACETATE AND A MIXTURE OF A COMPATIBLE
AND INCOMPATIBLE PLASTICIZER
AND METHOD OF PREPARATION
Filed Jan. 28, 1959 5 Sheets-Sheet 1

INVENTOR
MARVIN PACKER
BY
ATTORNEYS

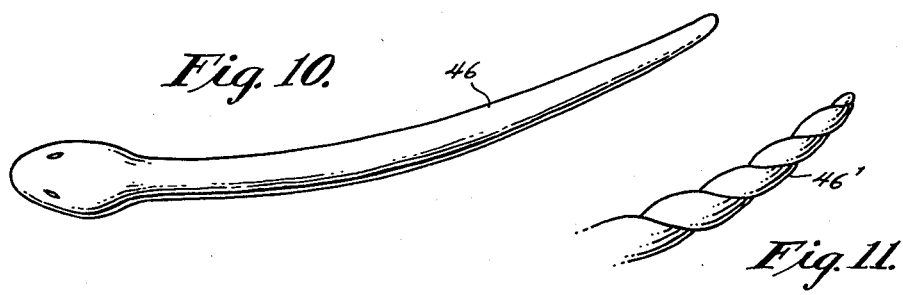
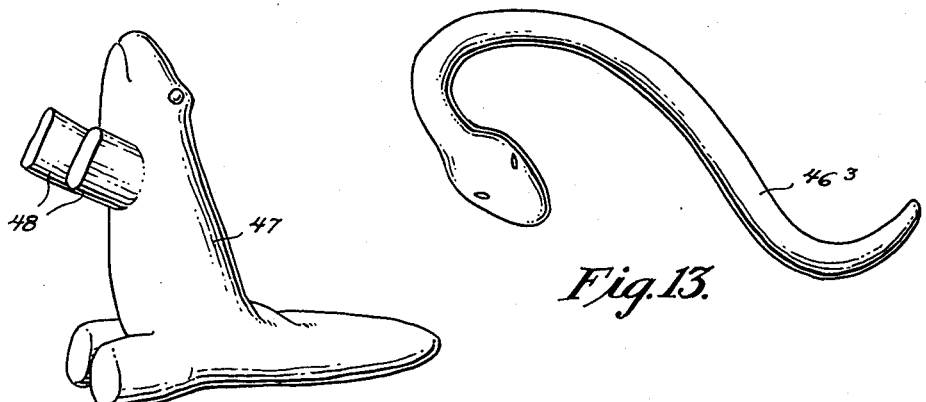
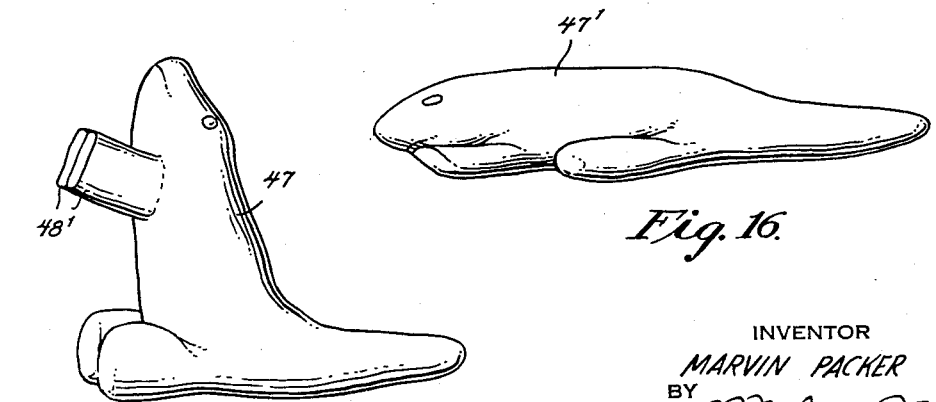

Oct. 30, 1962 M. PACKER 3,061,572
POLYVINYL ACETATE AND A MIXTURE OF A COMPATIBLE
AND INCOMPATIBLE PLASTICIZER
AND METHOD OF PREPARATION
Filed Jan. 28, 1959 5 Sheets-Sheet 3
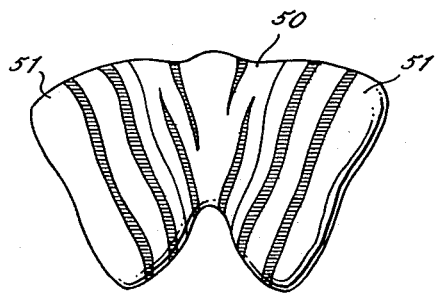
Fig. 17.
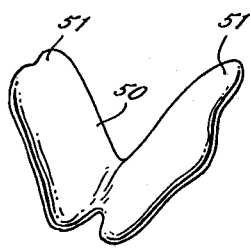
Fig. 18.
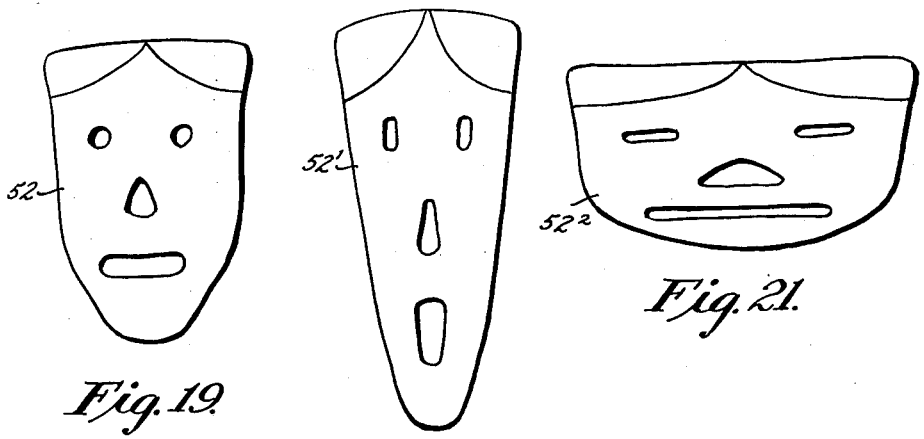
Fig. 19.
Fig. 20.
Fig. 21.
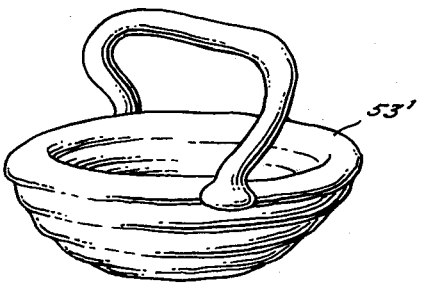
Fig. 22.
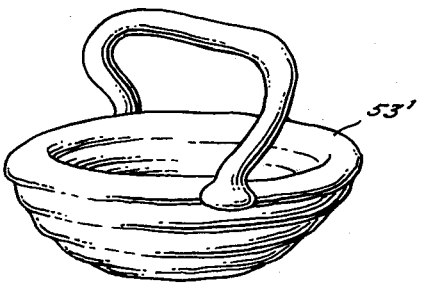
Fig. 23.
INVENTOR
MARVIN PACKER
BY
ATTORNEYS Oct. 30, 1962　　　　　M. PACKER　　　　3,061,572
POLYVINYL ACETATE AND A MIXTURE OF A COMPATIBLE
AND INCOMPATIBLE PLASTICIZER
AND METHOD OF PREPARATION Filed Jan. 28, 1959　　　　　　　　　　5 Sheets-Sheet 4

INVENTOR
MARVIN PACKER
BY
ATTORNEYS

Oct. 30, 1962

M. PACKER 3,061,572

POLYVINYL ACETATE AND A MIXTURE OF A COMPATIBLE
AND INCOMPATIBLE PLASTICIZER
AND METHOD OF PREPARATION

Filed Jan. 28, 1959

INVENTOR
MARVIN PACKER
BY
ATTORNEYS

United States Patent Office 3,061,572
Patented Oct. 30, 1962

3,061,572
POLYVINYL ACETATE AND A MIXTURE OF A COMPATIBLE AND INCOMPATIBLE PLASTICIZER AND METHOD OF PREPARATION
Marvin Packer, 416 Village Lane, Broomall, Pa.
Filed Jan. 28, 1959, Ser. No. 789,666
7 Claims. (Cl. 260—31.4)

The present invention relates to molding masses of a character which are particularly suitable for entertainment, education and pysiotherapeutic purposes. The invention also includes methods relating thereto.

This application has been divided and the subject matter relating to the toy figure having the property of animated motion has been embodied in divisional application Serial No. 7,560, filed February 9, 1960, for Toy Figure.

A purpose of the invention is to produce an improved molding mass for hand-molding by children and adults, for use as a toy, for education in muscular coordination, and for phsiotherapy as in the case of improving coordination and manipulation ability of those who have been partially or wholly incapaciated by injury or disease.

A further purpose is to produce a molding plastic mass which has high human interest and entertainment value by reason of the fact that it visibly snaps back or changes its shape after deformation. Thus the material if molded into the contour of an object like an animal which would be expected to move, exhibits the ability to modify shape in a manner which simulates motion.

A further purpose is to produce grotesque and amusing modifications of a molded contour by virtue of the operation of deformation of the molding material in a manner self-induced by residual stresses.

A further purpose is to produce a hand-molding material which is pleasant to the touch, being non-sticky, responsive to body temperature by reason of its temperature sensitivity, clean (free from greasy feel), non-adherent to most clothing and non-crumbly.

A further purpose is to produce an improved viscoelastic material which is rate-shear sensitive, which will undergo considerable elongation, which behaves as a solid at high rates of shear (higher than one reciprocal second), and which behaves as a liquid at lower rates of shear.

A further purpose is to permit the creation of improved toy animals which can be deformed and undergo visible bodily movement after deformation.

A further purpose is to incorporate a mixture of compatible and incompatible plasticizers with polyvinyl acetate resin in order to secure the properties mentioned above.

A further purpose is to use mixtures of high and low molecular weight (softening point) polyvinyl acetate resins in order to obtain improved built-in plasticizing action with very low tack.

A further purpose is to incorporate gas bubbles into the plastic of the invention in order to produce flotation.

Further purposes appear in the specification and in the claims.

In the drawings I have chosen to illustrate a few only of the numerous embodiments in which the invention may appear, selecting the forms shown from the standpoints of conveinence in illustration, satisfactory operation and clear demonstration of the principles involved.

FIGURE 10 is a top plan view of a snake of different proportions.

FIGURE 11 is a fragmentary view similar to FIGURE 10 showing the snake of FIGURE 10 having its tail twisted.

FIGURE 12 is a view similar to FIGURE 10 showing the beginning of snapback after the tail of the snake has been twisted.

FIGURE 13 is a view similar to FIGURE 10 showing the completion of snapback.

FIGURE 14 is a perspective showing a toy seal in accordance with the invention.

FIGURE 15 is a view showing the flappers of the seal moved together in a clapping motion. The toy seal will subsequently move his flappers apart under the action of snapback.

FIGURE 16 show an advanced stage of flow of the toy seal of FIGURE 15.

FIGURE 17 is a plan view of a butterfly produced according to the invention, illustrating a marbelized effect.

FIGURE 18 is an end elevation of the butterfly showing the closing of the wings followed by the action of snapback.

FIGURE 19 is a front elevation of a toy mask from the mass of the invention.

FIGURE 20 is a view of the toy mask longitudinally distorted by the hands.

FIGURE 21 is a view of the toy mask laterally distorted by the hands.

FIGURE 22 is a perspective of a toy basket according to the invention.

FIGURE 23 is a view of the toy basket after it has undergone flow.

Figure 1:
FIGURE 1 is a front elevation of a snowman produced in accordance with the invention immediately after molding.

Describing in illustration but not in limitation and referring to the drawings:

The present invention is concerned with the production of a mass which is particularly suitable for hand-molding.

One field in which the plastic mass of the invention is very useful is the production of toys and amusement devices for children and also for adults. Another use is in the therapeutic field, as to aid those having limited coordination of the hands or arms. A further application of the invention is in education of children to develop muscular coordination and in exercise of the fingers, arms and shoulders by children and adults.

The molding mass of the invention is particularly interesting because it changes its shape or snaps back after deformation, and it undergoes flow after shaping by the hands or otherwise.

The plastic mass of the invention is very pleasant to the user because it is non-tacky or non-sticky, it has a clean or non-greasy feel, it is non-crumbly or normally remains coherent unless special effort is made to separate it into parts, and it can be fusion welded at body temperature, or sealed into a homogeneous mass by the pressure of the hands.

The desirable hand-molding properties are aided by the fact that the plastic mass is viscoelastic, behaving much like a highly viscous fluid when manipulated under low rates of shear (one reciprocal second or less). On the other hand under high rates of shear (higher than one reciprocal second) it behaves as a solid and can therefore be pulled apart with a clean break.

The plastic mass of the invention is thus rate-shear sensitive.

The product of the invention is also temperature sensitive, so that the warmth of the hands or body will render it relatively soft, and it will become appreciably firmer when the heat of the hands or body is removed.

The plastic mass of the invention is capable of being formed in stiff, intermediate or soft grades, the soft materials being especially suited for manipulation by small children or relatively weak persons during the initial phase of therapy, and the stiffer materials being more suited to molding by the hands of adults, or for exercise of adults, or of adult patients during convalescence.

The plastic mass will undergo very considerable elongation without tearing or breaking, and is capable of forming into sheets even by hand manipulation.

It also is capable of being formed by very simple equipment as a rolling pin, bread board and cookie cutter. It can be formed under the action of gas as by blowing bubbles.

Considering now the composition in more detail, the base of the material is polyvinyl acetate resin.

Any one of the commercial grades of polyvinyl acetate resin may be used, the best available materials known to me being as follows:

| PVA resin: | Softening point |
|---|---|
| AYAC | 89.6° |
| AYAA | 150.8° |
| AYAF | 170.6° |
| AYAT | 187° |

In addition to the polyvinyl acetate resin, it is necessary to incorporate two different plasticizers, one of which is a compatible plasticizer and the other of which is a non-compatible plasticizer. When reference is made herein to a compatible plasticizer, it is intended to designate a plasticizer which is mutually soluble in the resin suitably at a higher blending temperature and is mutually soluble at room temperature as evidenced by the fact that there is no bloom. An incompatible plasticizer, on the other hand, is a plasticizer which is mutually miscible at the higher blending temperature but which is not completely soluble at room temperature as evidenced by the fact that it produces bloom and/or spewing. When bloom is referred to in the claims it is intended to include spewing.

The proportion of compatible plasticizer based on 100 parts of polyvinyl acetate resin should be between 15 and 40 parts by weight.

The proportion of incompatible plasticizer based on 100 parts of polyvinyl acetate resin should be between 7 and 25 parts by weight.

There is a considerable advantage in using a low molecular weight polyvinyl acetate resin mixed with intermediate or high molecular polyvinyl acetate resin because the low molecular weight polyvinyl acetate resin tends to partially plasticize the intermediate or high molecular weight polyvinyl acetate resin, giving the desirable properties completely without tack. When I refer to low molecular weight polyvinyl acetate resin I mean one that has a softening point below 100° F. When I refer to an intermediate or high molecular weight polyvinyl acetate resin I mean a polyvinyl acetate resin having a softening point of 100° F. or above.

To get the most desirable properties from a mixture of a low molecular weight and an intermediate or high molecular weight polyvinyl acetate resin, the proportions of these two resins by weight should be between 1 part of low and 1.2 parts of intermediate or high molecular weight and 1 part of low and 2 parts of intermediate or high molecular weight.

For a relatively soft material, the parts by weight of compatible plasticizer per 100 parts by weight of resin should be between 25 and 40, and the parts by weight of incompatible plasticizer should be between 10 and 25.

For stiffer material the parts by weight of compatible plasticizer should be between 15 and below 25, and the parts by weight of incompatible plasticizer should be between 7 and below 15.

Suitable examples of compatible plasticizers are as follows:

Tricrseyle phosphate
Triethylene glycol di-(2 ethyl butyrate)
Triethylene glycol di-(2 ethyl hexoate)
Dibutoxy glycol phthalate
Butyl phthalyl butyl glycolate Examples of incompatible plasticizers suitable for use in the present invention are as follows:

Acetyl tri-(2-ethylhexyl) citrate
2,2'-(2-ethylhexamido) diethyl di-(2-ethyl hexoate)
Polyoxy propylene glycol ethylene oxide
Tri-(2-ethyl hexyl) phosphate
Dioctyl phthalate
Didecyl adipate
Castor oil
Linseed oil

*Mixing Techniques*

One very convenient way to accomplish mixing of the ingredients in accordance with the invention is by using a mutual volatile solvent to create a homogeneous mixture, and then eliminate the solvent either by artificial evaporation or natural evaporation.

Any suitable polyvinyl acetate solvent in which all the plasticizers dissolved may be used, the most suitable material being a ketone solvent, such as methylethyl ketone, methylisobutyl ketone, cellossolve solvent, acetone, or mixtures of methylethyl ketone with xylene, toluene or the like. The quantity of solvent should preferably be at least 20% by weight of the total resin, and much greater quantities of solvent can be used if desired to hasten the operation.

In accordance with the invention the resins and plasticizers can suitably be mixed together with a solvent and the entire mixture stirred or mechanically mixed by a blade mixer or any other sutiable heavy duty stirring device. This can be done at room temperature or elevated temperature.

Another way of mixing is to dissolve the resin in the solvent and then add the plasticizer.

Still another method of mixing is to dissolve the resin in the solvent with the aid of heat, and then introduce the plasticizer.

If desired, on the other hand, the resins and plasticizers can be heated and mixed together to form a homogeneous mass without using any volatile solvent. The temperature used may be of the order of 250° F.

*Added Ingredients*

Other added ingredients may be employed, such as pigments and fillers. Usually the pigment need only be of the order of 0.5 to 5% by weight on the resin, suitable pigments being carbon black, and the various phthalocyanine colors such as blue and green. Suitable pigments for other colors are available such as barium sulfate, titanium dioxide, calcium carbonate, and hansa yellow.

Filler may be used if desired, suitably up to 100% of the weight of the resin and preferably in the range between 5 and 50% of the weight of the resin. Suitable fillers are talc, silica, calcium carbonate, barium sulfate, bentonite, diatomaceous earth and the like, all in powder form.

The invention lends itself to production in bright and pastel colors as well as white and black. Metallic colors such as powdered metals can be incorporated, suitable metals being aluminum, brass, bronze, silver, gold, etc. The preferred proportions are 0.1 to 5 percent by weight of the resin.

The invention can be used with small amounts, up to 2 percent on the total mass, of lubricating agents incorporated, such as silicone oil. This is not generally considered necessary.

The table following gives suitable examples of formulations of the plastic mass according to the invention; the units are pounds:

| Example | 1 | 2 | 3 | 4 | 5 | 6 | 7 | 8 |
|---|---|---|---|---|---|---|---|---|
| AYAC | 100 | 100 | 100 | 100 | 100 | — | — | 100 |
| AYAA | — | — | 200 | 120 | — | 100 | — | 200 |
| AYAF | 120 | 120 | — | — | — | — | 100 | — |
| AYAT | — | — | — | — | 120 | — | — | — |
| Triethylene glycol di(2 ethyl butyrate) | 80 | 33 | — | — | 84 | 20 | — | 75 |
| Tricresyl phosphate | — | — | 70 | 75 | — | — | 17 | — |
| Dioctyl phthalate | 50 | 10 | — | — | 53 | 13 | — | 50 |
| Didecyl adipate | — | — | 45 | 50 | — | — | 10 | — |
| Talc | 50 | 15 | 30 | 40 | — | — | 7 | — |
| Calcium carbonate | — | — | — | — | 22 | — | — | — |
| Pigment | 2 | 2 | 2 | 2 | 2 | 1 | 1 | — |

Example 1 shows a mixture of AYAC and AYAF plasticized to produce a soft formulation which can readily be manipulated by children.

Example 2 shows a similar formulation which is relatively stiff and requires considerable strength for molding.

Example 3 illustrates a formulation of AYAC and AYAA which is relatively stiff.

Example 4 gives a similar formulation which is soft.

Example 5 shows a formulation of AYAC and AWAT which is soft.

Example 6 shows a formulation of AYAA alone which is of intermediate stiffness.

Example 7 gives a formulation of AYAF alone which is relatively stiff.

All of these formulations includes fillers and pigments.

Example 8 shows a formulation of intermediate softness which uses AYAC and AYAA and contains no filler or pigment.

All of the materials of the invention are non-curing and can be used for considerable periods of time without great change in properties.

There is limited spewing of plasticizer in all of the formulations according to the invention, but this is of a character which does not soil the hands or clothing, but merely exhibits parting properties.

While the materials of the invention are non-sticky in the sense that they can come in contact with fabrics without permanently adhering, they have a slight tendency to engage surfaces which is not as pronounced as the adherence which would be considered adhesive action, but allows the plastic mass to support its own weight and to support light weight objects engaged to it.

The invention may be made in the form of a completely non-toxic material by using non-toxic plasticizers, pigment and fillers.

The molding material of the invention can be blended to produce intermediate colors as for example by blending white and red to make pink, and also it can be mixed without homogenizing to produce marbelized effects of varigated colors.

Figure 2:
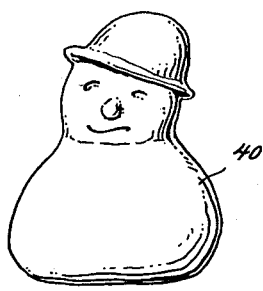
FIGURE 2 is a view similar to FIGURE 1 showing the snowman after it has begun to deform without exterior force application.
Figure 3:
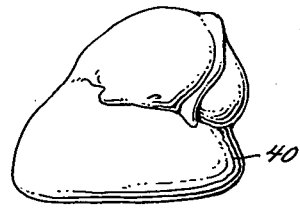
FIGURE 3 is a view similar to FIGURE 1 showing the snowman after further flow without exterior force application.

FIGURES 1, 2 and 3 show a snowman 40 which in FIGURE 1 has been molded by the hands in the usual snowman form. The technique followed has been to take a mass or ball or block of the material of the invention, warm it and knead it by the hands wherever necessary and shape it with the fingers to the shape shown in FIGURE 1. The material will undergo extreme elongation during the forming, and is very pleasant from the standpoint of the user because it feels clean and does not crumble or break apart in the hands. It is quite safe from the standpoint of children and sick persons, as it can be made with a selection of non-toxic plasticizers such as the citrates or adipates given above, with dioctyl phthalate. If desired, the material can be molded in a mold, and will part satisfactorily from the mold.

From the standpoint of safety, the material burns only very slowly, and with use of the tricresyl phosphate plus dioctyl phthalate can be made very slow burning.

An interesting feature of the invention is that flow then takes place and in FIGURE 2 the snowman is shown partially sagged a few minutes after forming and in FIGURE 3 the snowman is shown almost restored to the initial blob form.

Figure 4:
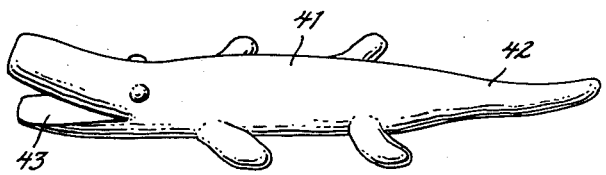
FIGURE 4 is a perspective of a toy crocodile or alligator produced by the mass of the invention.
Figure 5:
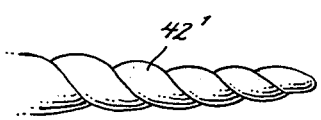
FIGURE 5 is a fragmentary perspective showing the twisting of the tail of the toy crocodile or alligator.
Figure 6:
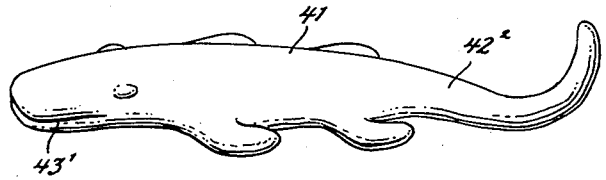
FIGURE 6 is a perspective showing the snapback of the tail after twisting and also the closure of the mouth.
Figure 7:
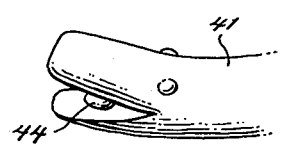
FIGURE 7 is a fragmentary perspective showing the "play" feeding of the crocodile.

The invention lends itself well to the production of animals which can undergo motion as in the case of the crocodile or alligator of FIGURES 4, 5 and 6. FIGURE 4 shows the crocodile or alligator 41 as molded with the mouth open. FIGURE 5 shows the tail 42 twisted at 42', and FIGURE 6 shows the snap-back of the tail to the position $42^2$ by reason of the high recoverability or very great plastic memory. It will also be noted that the mouth 43 which was open in FIGURE 4 has closed under flow, as shown at 43' in FIGURE 6. If desired, however, the child can insert an object like another small piece of plastic mass 44 into the mouth in FIGURE 7 to simulate feeding of the animal.

Figure 9:
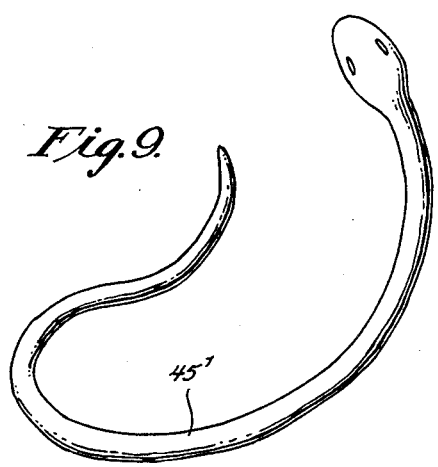
FIGURE 9 is a view similar to FIGURE 8 showing the self uncoiling of the snake of FIGURE 8.
Figure 8:
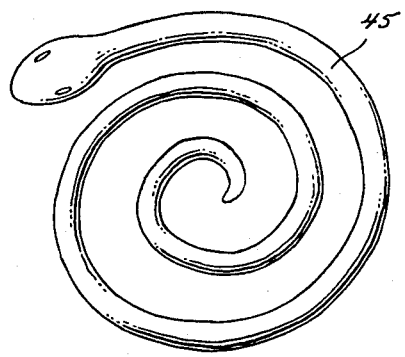
FIGURE 8 is a perspective of a simulation of a snake according to the invention, the snake being coiled.

FIGURES 8 and 9 show the formation of a relatively elongated snake 45 which in FIGURE 8 is in a coil but in FIGURE 9 has snapped back to uncoil at 45'.

In the case of a shorter, thicker snake, as shown in FIGURES 10 to 13, a somewhat different effect is exhibited. Here the snake 46 is stretched out straight in FIGURE 10, and its tail is twisted at 46' in FIGURE 11, causing the tail to snap back at $46^2$ in FIGURE 12 and undergo a further extensive snap-back as shown at $46^3$ in FIGURE 13.

The principles of the invention can be applied to form other animals as the seal 47 in FIGURES 14 to 16, which has flappers 48 in FIGURE 14 which are brought together by the user at 48' in FIGURE 15. The flappers then move apart by the snap-back action and subsequently the seal flows down to the form shown at 47' in FIGURE 16.

The motion of parts of the animal's body can be simulated in a wide variety of forms.

FIGURES 17 and 18 show a butterfly 50 having wings 51 made of marbelized stripes of different colors of the plastic mass of the invention. The wings are bent by the child in FIGURE 18 and will snap back.

The invention can be applied to objects which are deliberately stressed as the mask 52 of FIGURE 19 which is pulled out longitudinally to produce one form of funny face at 52' in FIGURE 20 and pulled out laterally to form another form of funny face at 52² in FIGURE 21.

The invention can also be used to mold objects by forming elongated strips and twisting them together, as by the coil 53 of FIGURE 22 which forms a basket with handle 54, the basket then slumping down to the form 53' in FIGURE 23. The plastic welds well to itself.

Figure 24:
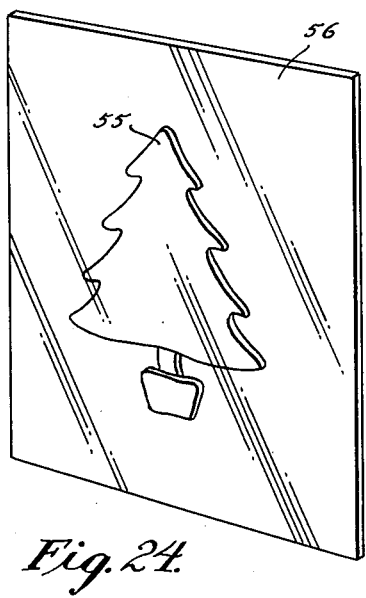
FIGURE 24 is an elevation of a window decoration using the material of the invention.

While the material of the invention is substantially free from tack, it can take light hold on many surfaces and be pulled away again. FIGURE 24 shows this property being used to form a Christmas tree 55 on a window glass 56 using the plastic mass of the invention. The Christmas tree will remain in place for a considerable time and can be pulled off without leaving a smear.

Figure 25:
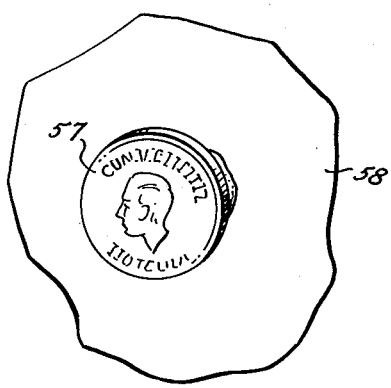
FIGURE 25 is a perspective of the mass of the invention performing a magic trick.
Figure 26:
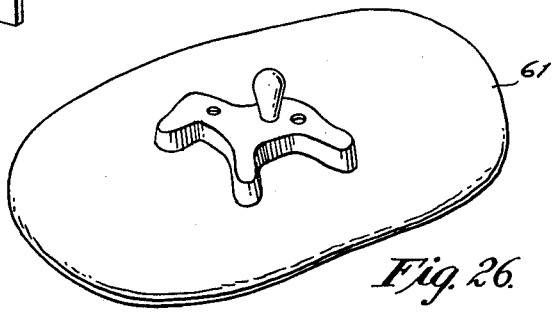
FIGURE 26 is a perspective of a cut-out of an object according to the invention.
Figure 27:
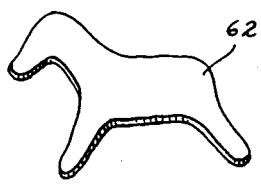
FIGURE 27 is a perspective of the object which has been cut out.

The material can also be used to hold objects, as for mounting papers on a bulletin board, or for performing magic tricks, as shown in FIGURE 25 where a coin 57 is mounted on a wall 58 by a small piece of the plastic material of the invention. The plastic mass of the invention can be formed into objects of numerous shapes, as illustrated in FIGURE 26 where it is rolled out into a sheet 61 as by a breadboard and rolling pin and cut into a shape 62 by a cookie cutter for the enjoyment of children or others. It can be cut clean by scissors or otherwise.

Figure 28:
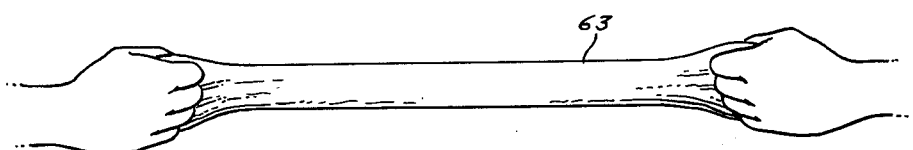
FIGURE 28 is an elevation of the mass of the invention used as an exercise material.

The invention can be used as an exercise device or as material for one of many games. In FIGURE 28 I illustrate a strip of the material of the invention 63 which can be pulled out to exercise the arms, shoulders and fingers, can be used as a rope, and can be used in a tug-of-war. It will of course be evident that the kneading of the plastic requires a great deal of strength in the case of the stiff material, but much less strength in the case of the softer materials.

Figure 29:
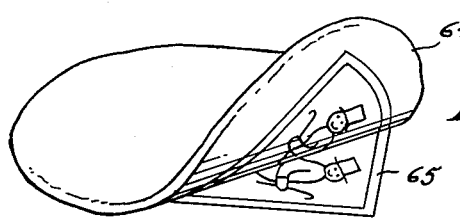
FIGURE 29 is a perspective showing the pick up and transfer of written or printing matter by the material of the invention.

In FIGURE 29 I show a sheet of the material of the invention preferably of light color at 64 which is picking up printing from a newspaper 65, by pressing it against the newspaper and then pulling it off, and then pressing the material of the invention against a paper or other surface to transfer the marks, and then removing the plastic. This works best when the newspaper is freshly printed and also when the plastic material is in softer state. This can be used to pick up marks of soft lead pencils.

Figure 30:
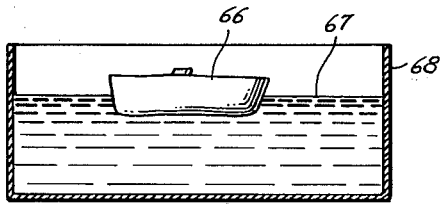
FIGURE 30 is a vertical elevation showing a flotation device using the mass of the invention.
Figure 31:
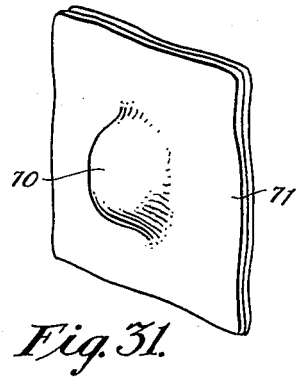
FIGURE 31 is a perspective showing the formation of bubbles by the invention.

The principles of the invention may sometimes be employed by forming bubbles of air or other gas in the material. This can be done by hand by deliberately entrapping air while hand working the material. Such objects float as shown at 66 on water 67 in a pan 68 in FIGURE 30. Also large air bubbles 70 can be produced in sheets of the plastic of the invention 71 by the hands, or bubbles can be blown in thin sheets of the material by the mouth in a manner similar to the technique used in blowing bubble gum.

Figure 32:
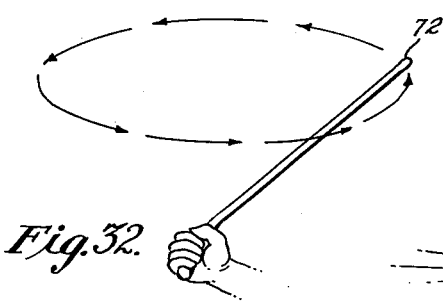
FIGURE 32 is a perspective showing the production of a whirring noise by the material of the invention.
Figure 33:
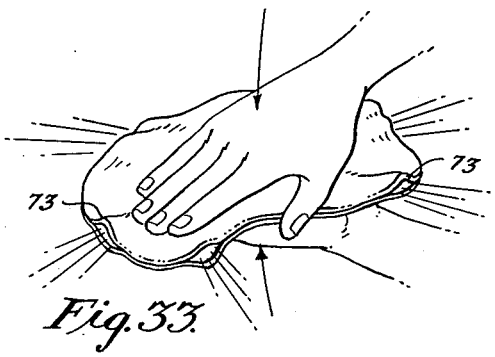
FIGURE 33 is a perspective showing the production of a cracking noise by the material of the invention.

The principles of the invention can be used to produce noise, as in FIGURE 32 where a strip or rope of the plastic of the invention is whirled at 72, or such a strip can be pulled while under tension to produce toy vibratory sounds simulating musical instruments. Also, large or small bubbles of air or other gas in the material can be broken under pressure as shown at 73 in FIGURE 33 to produce a cracking noise.

Figure 34:
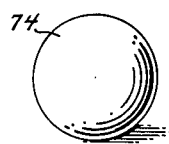
FIGURE 34 is a perspective showing a marble according to the invention.

The material of the invention does not bounce or in the softer formulation does not shatter under impact, and it can be made into marbles 74 as shown in FIGURE 34 which can be spherically shaped or made in various "crazy" shapes to add hazards to the game of marbles.

Figure 36:
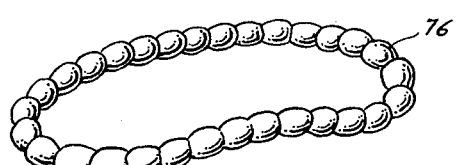
FIGURE 36 is a plan view showing a necklace according to the invention.
Figure 35:
FIGURE 35 is a perspective showing a jumping rope according to the invention.

The material of the invention can be used in jumping rope, as shown at 75 according to the invention and also lends itself well to use by children to make toy jewelry such as the necklace 76 in FIGURE 36. It can similarly be braided into interesting shapes or forms.

Figure 37:
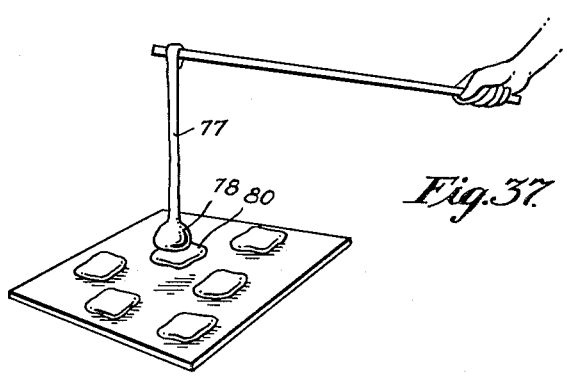
FIGURE 37 is a perspective showing a child "fishing" with the mass of the invention.

The material of the invention welds readily to itself, and it can be used in the game of "fishing," as shown in FIGURE 37 where a strip of material 77 of the invention having a knob 78 at the lower end can with sufficient dexterity be made to pick up a ball or block 80 of the same material by manipulating from the upper end of the strip.

By a quick jerk or pull, the material can be broken apart for the purpose of separation or it can be cut by scissors without clogging the scissors.

It will be evident that any plasticizer which does not not give a soft easily manipulative mass in unsuitable for use in the present invention.

In view of my invention and disclosure variations and modifications to meet individual whim or particular need will doubtless become evident to others skilled in the art, to obtain all or part of the benefits of my invention without copying the method and structure shown, and I, therefore, claim all such insofar as they fall within the reasonable spirit and scope of my claims.

Having thus described my invention what I claim as new and desire to secure by Letters Patent is:

1. A toy fabricating hand-moldable non-curing plastic mass which is viscoelastic, rate shear sensitive, lacking dimensional stability, temperature sensitive to the extent of forming in the hands, ductile in the hands, non-crumbly and non-sticky, having the property of snapback after deformation, behaving rheologically as a solid at high rates of shear and as a liquid at low rates of shear, comprising a homogeneous mixture of polyvinyl acetate resin having a softening point between 89.6 and 187° F., from 15 to 40 parts of compatible plasticizer per 100 parts by weight of total resin, and from 7 to 25 parts of incompatible plasticizer per 100 parts by weight of total resin; a compatible plasticizer being one which will not bloom and an incompatible plasticizer being one which will bloom.

2. A toy fabricating hand-moldable mass of claim 1, having from 25 to 40 parts of compatible plasticizer and having 15 to 25 parts of incompatible plasticizer, forming a soft molding formulation.

3. A toy fabricating hand-moldable mass of claim 1, having from 15 to less than 25 parts of compatible plasticizer, and from 7 to less than 15 parts of incompatible plasticizer, forming a stiff molding formulation.

4. A toy fabricating hand-moldable mass of claim 1, comprising polyvinyl acetate resin of softening point below 100° F. and polyvinyl acetate resin of softening point at or above 100° F., the proportions of the low to high softening point resins being by weight between 1 to 1.2 and 1 to 2.

5. A toy fabricating hand-moldable mass of claim 1, comprising polyvinyl acetate resin of softening point below 100° F. and polyvinyl acetate resin of softening point at or above 100° F., the proportions of the low to high softening point resins being by weight between 1 to 1.2 and 1 to 2, having from 15 to less than 25 parts of compatible plasticizer, and from 7 to less than 15 parts of incompatible plasticizer, forming a stiff molding formulation.

6. The method of producing a molding plastic which has the property of snapback after deformation, which comprises incorporating together in a homogeneous mass polyvinyl acetate resin having a softening point between 89.6 and 187° F., a compatible plasticizer in the proportions of 15 to 40 parts per 100 parts by weight of total resin, and an incompatible plasticizer in the proportions of 7 to 25 parts per 100 parts by weight of total resin, a compatible plasticizer being one which will not produce bloom and an incompatible plasticizer being one which will produce bloom.

7. The method of claim 6, which comprises mixing together polyvinyl acetate resin of softening point below 100° F. and polyvinyl acetate resin of softening point at or above 100° F. in the proportions of low to high softening point resin of between 1 to 1.2 and 1 to 2 parts by weight.

References Cited in the file of this patent

UNITED STATES PATENTS

| | | |
|---|---|---|
| 2,240,031 | Bour | Apr. 29, 1941 |
| 2,306,863 | Bour | Dec. 29, 1942 |
| 2,459,955 | Morrison et al. | Jan. 25, 1949 |
| 2,525,880 | Feldman | Oct. 17, 1950 |
| 2,558,378 | Petry | June 26, 1951 |
| 2,578,688 | Fraser | Dec. 18, 1951 |
| 2,596,491 | Kinberg | May 13, 1952 |
| 2,636,871 | James et al. | Apr. 28, 1953 |
| 2,666,036 | Schwencke | Jan. 12, 1954 |
| 2,825,711 | Mayfield | Mar. 4, 1958 |
| 2,830,402 | Schleich | Apr. 15, 1958 |
| 2,872,429 | Schwartz | Feb. 3, 1959 |
| 2,885,377 | Knowles | May 5, 1959 |